Aug. 12, 1947.  T. E. HAYES  2,425,318
PAPER MONEY SORTING MACHINE
Filed April 18, 1945  12 Sheets-Sheet 1

Inventor
T. E. Hayes
By Mason Fenwick & Lawrence
Attorneys

Aug. 12, 1947.  T. E. HAYES  2,425,318
PAPER MONEY SORTING MACHINE
Filed April 18, 1945   12 Sheets-Sheet 2

Inventor
T. E. Hayes
By Mason Fenwick & Lawrence
Attorneys

Aug. 12, 1947. T. E. HAYES 2,425,318
PAPER MONEY SORTING MACHINE
Filed April 18, 1945  12 Sheets-Sheet 3
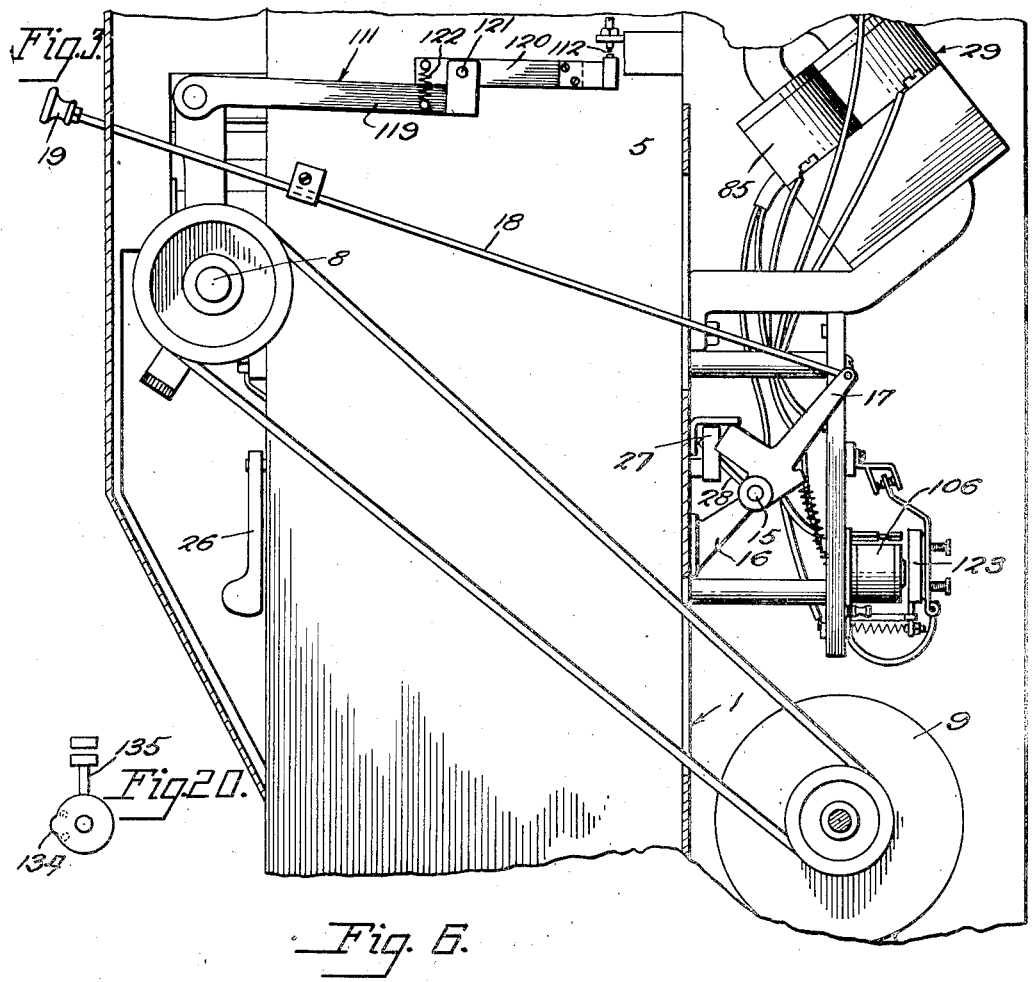
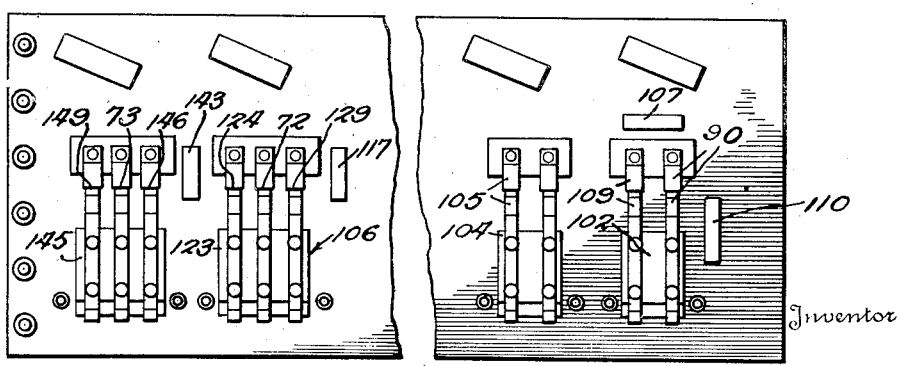
Inventor
T. E. Hayes
By Mason Fenwick & Lawrence
Attorneys Aug. 12, 1947.　　　T. E. HAYES　　　2,425,318
PAPER MONEY SORTING MACHINE
Filed April 18, 1945　　　12 Sheets-Sheet 4

Inventor
T. E. Hayes

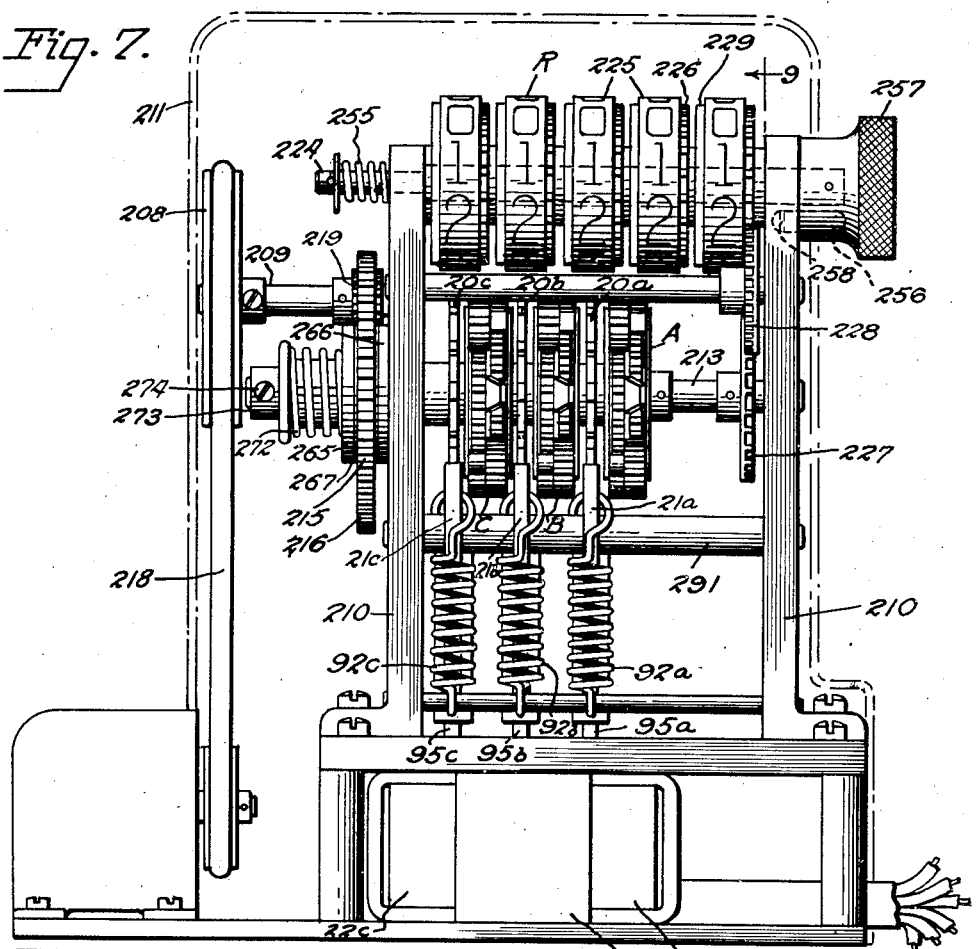

Aug. 12, 1947.  T. E. HAYES  2,425,318
PAPER MONEY SORTING MACHINE
Filed April 18, 1945  12 Sheets-Sheet 6

Inventor
T. E. Hayes
By Mason Fenwick & Lawrence
Attorneys

Aug. 12, 1947.  T. E. HAYES  2,425,318
PAPER MONEY SORTING MACHINE
Filed April 18, 1945  12 Sheets-Sheet 7
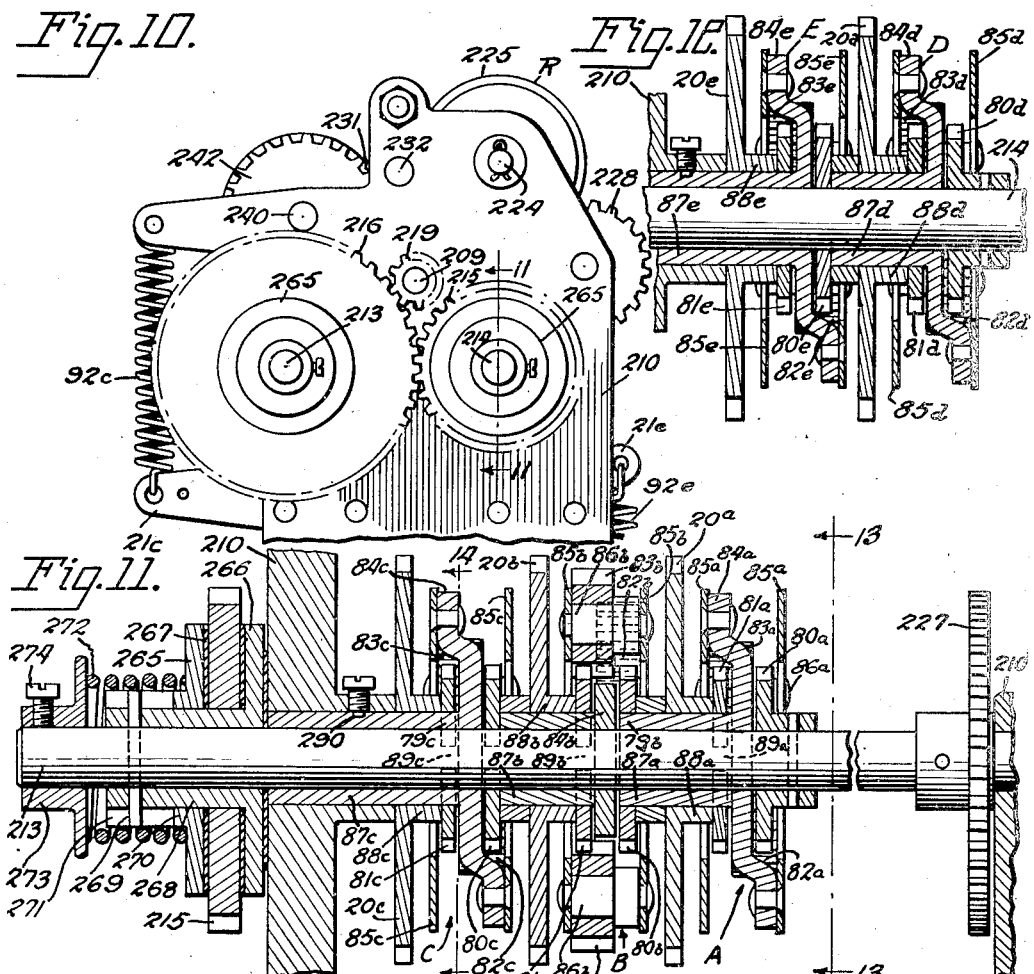
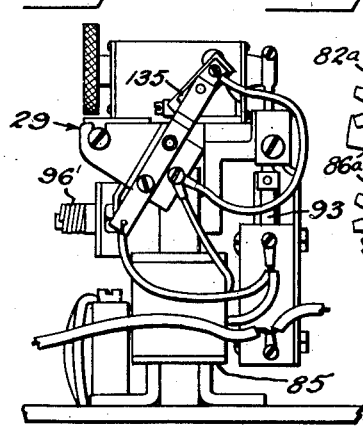
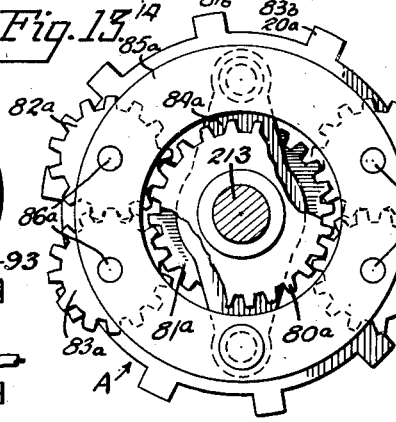
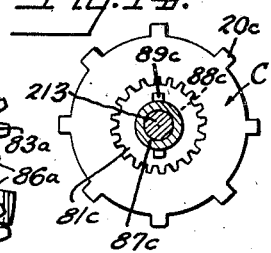
Inventor
T. E. Hayes
By Mason Fenwick & Lawrence
Attorneys Aug. 12, 1947. T. E. HAYES 2,425,318
PAPER MONEY SORTING MACHINE
Filed April 18, 1945 12 Sheets-Sheet 8

Inventor
T. E. Hayes

Aug. 12, 1947.　　　　T. E. HAYES　　　　2,425,318
PAPER MONEY SORTING MACHINE
Filed April 18, 1945　　　12 Sheets-Sheet 9
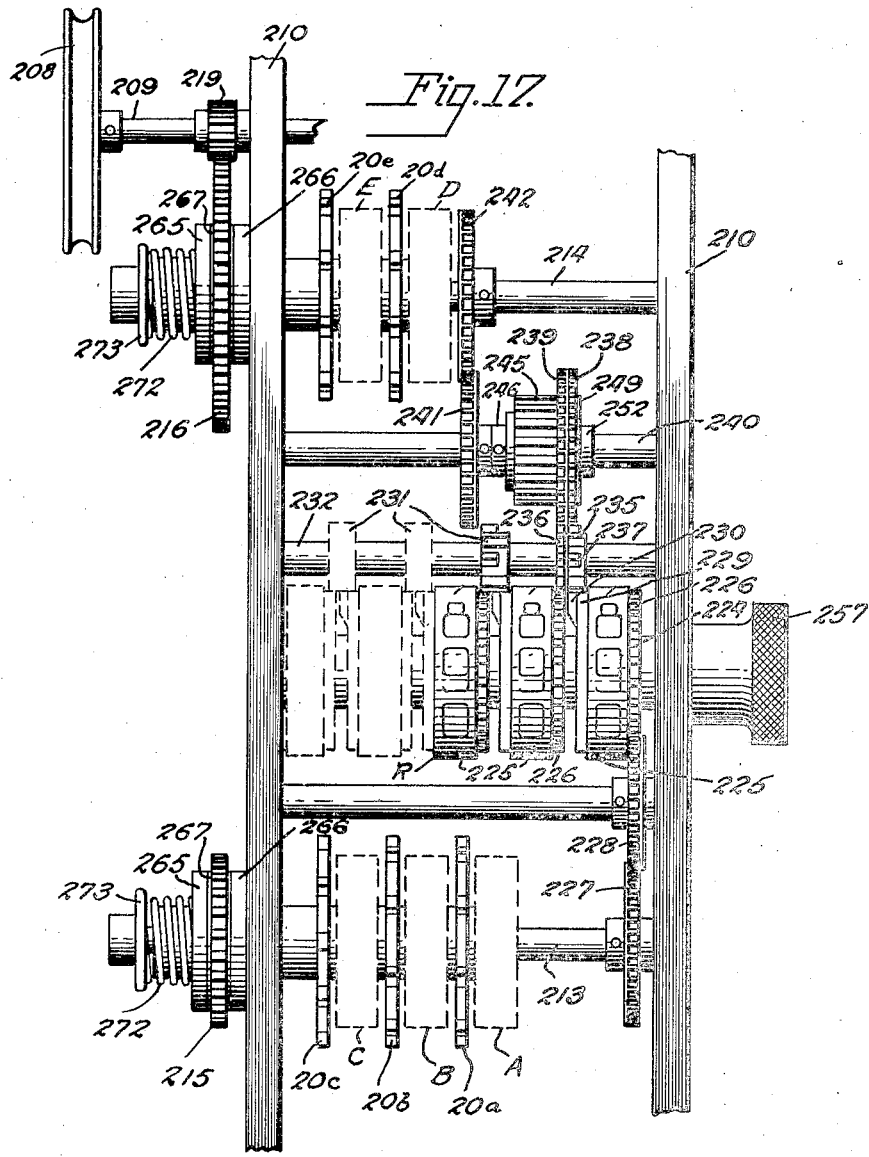
Inventor
T. E. Hayes

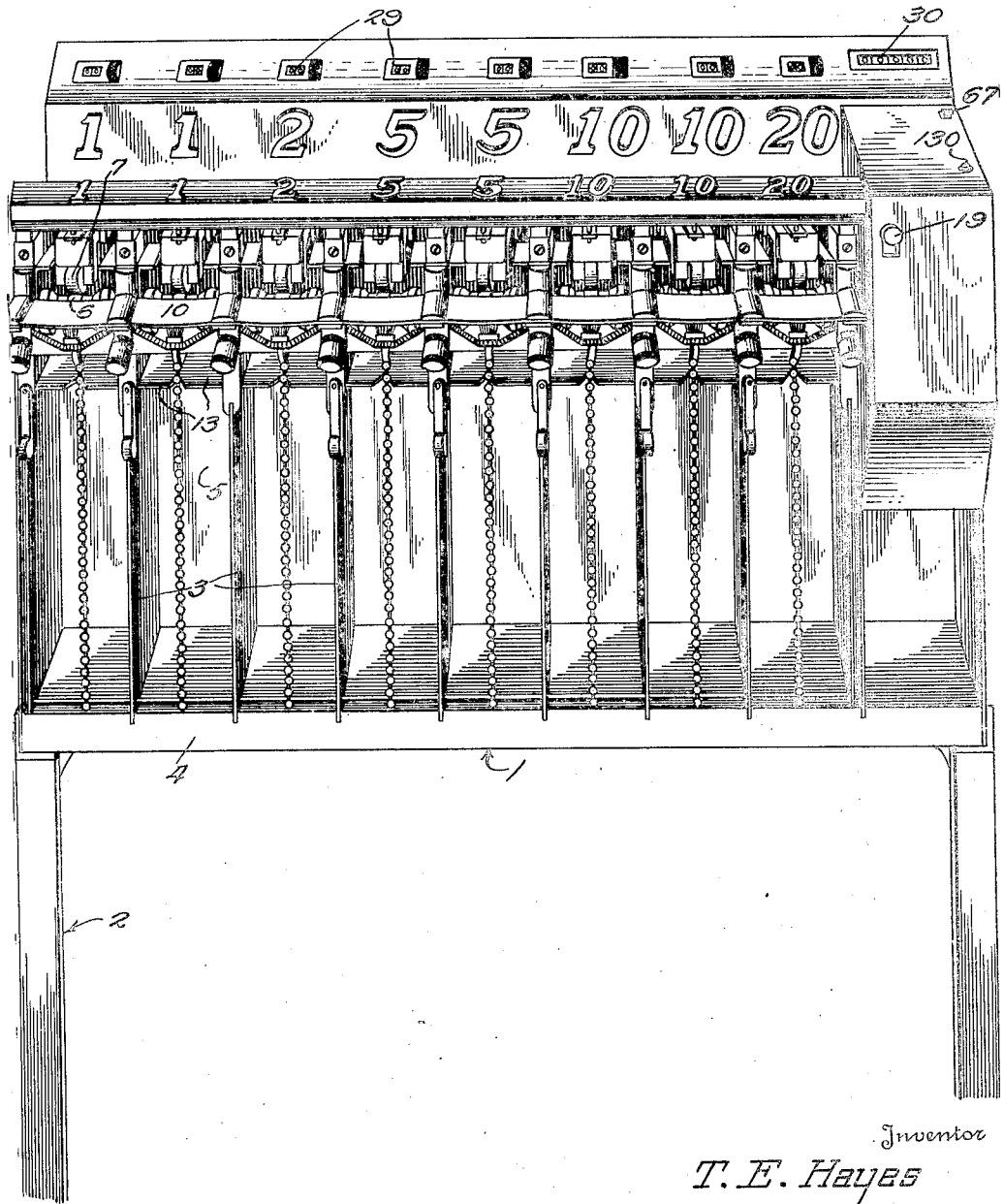

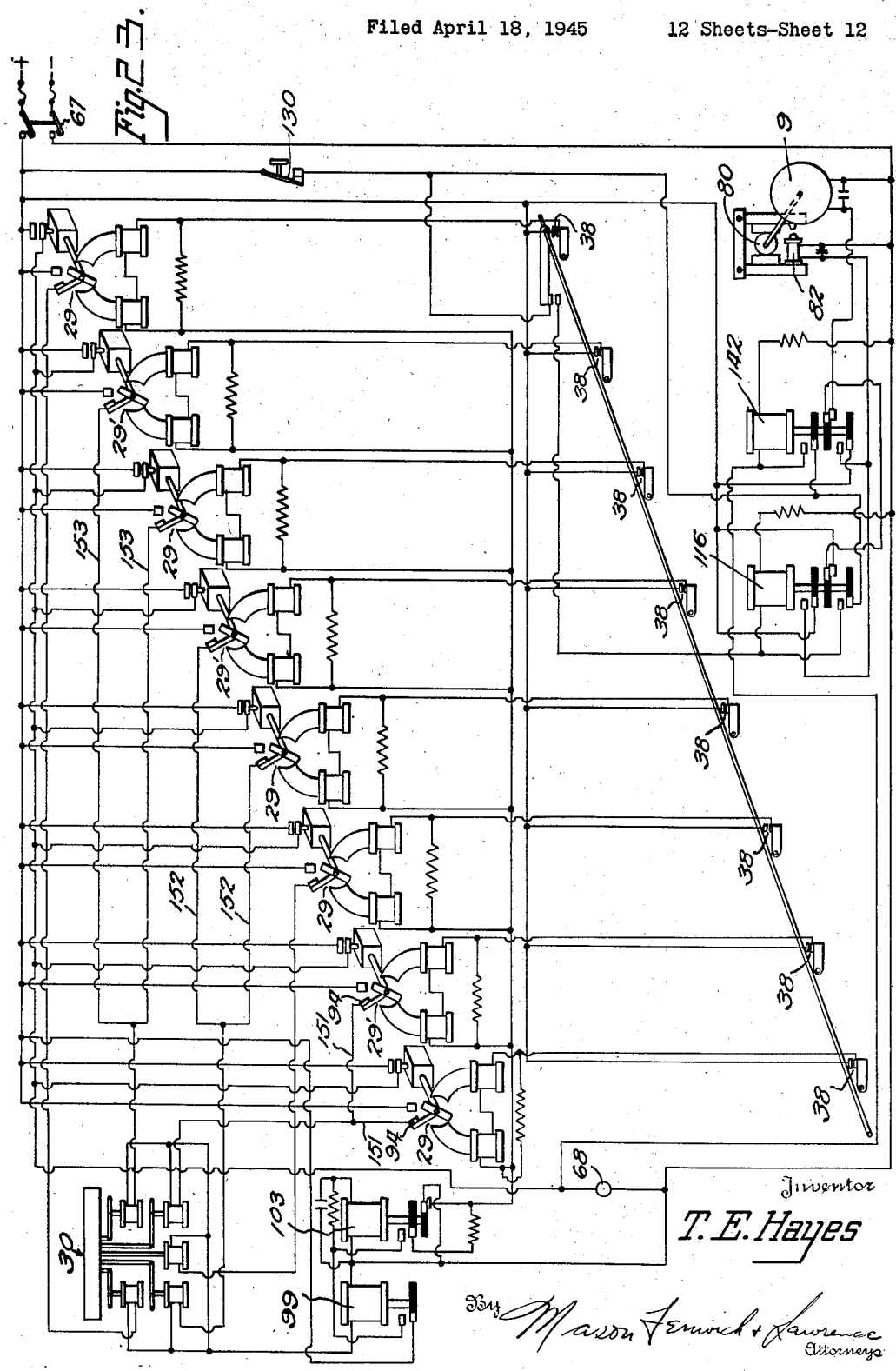

Patented Aug. 12, 1947

2,425,318

UNITED STATES PATENT OFFICE 2,425,318

PAPER MONEY SORTING MACHINE

Thomas E. Hayes, Washington, D. C.

Application April 18, 1945, Serial No. 588,939

3 Claims. (Cl. 235—92)

This invention relates to a machine having for its general object to provide for the manual sorting of mixed paper currency according to denominations, to piece-count the bills of each denomination as they accumulate, and to totalize the value of the bills of all the denominations as they are counted.

Since the totalized value of any batch of bills run into the machine is used as a check on the accuracy of distribution of the bills to the several denomination compartments of the machine, it is an important object of the invention to provide for the actuation of the totalizer responsive to the movement of an element of the individual piece-counters only after said element has moved sufficiently to assure the counting of a piece.

Among the more specific objects of the invention is to provide a machine including a value totalizer having a series of digit wheels including a units wheel, a tens wheel and additional wheels of higher order, and a series of compartments identified with the denomination number of the bills, for example, one, two, five, ten, twenty, into which bills of corresponding denominations are designed to be selectively fed, one at a time, there being bill actuated means individual to each compartment, operatively associated with a corresponding individual piece-counter, and through a piece counting movement of the piece-counter, with the totalizer for causing the latter to register a value count corresponding to the identification number of the compartment to which a bill is presented, the single digit compartments being operatively associated with the units wheel and the two digit compartments being operatively associated with the tens wheel, with mechanism between the said bill actuated means and the operative units and tens wheel for moving the respective wheels through a number of steps equal to the identification number of the single digit compartment or the tens digit of the two digit compartment, to which the bill is fed.

Other objects of the invention will appear as the following description of a preferred and practical embodiment thereof proceeds.

In the drawings which accompany and form a part of the following specification, and throughout the figures of which the same characters of reference have been employed to designate identical parts:

Figure 3 is a vertical section taken on the line 3—3 of Figure 1;

Figure 6 is a rear view in elevation of the panel constituting the relay mount;

Figure 7 is a front view of a totalizer with the casing thereof shown in dotted lines;

Figure 10 is a detail view looking at the left-hand end of the upper portion of the machine, the casing and the pulley on the drive shaft being omitted;

Figure 11 is a sectional view taken longitudinally and centrally through the series of differential gearings A, B and C representing the three lowest denominations;

Figure 12 is a sectional view taken longitudinally and centrally through the series of differential gearings D and E representing the two higher denominations;

Figure 13 is a side view of the differential gearing of lowest denomination, this view being taken substantially on the line 13—13 of Figure 11;

Figure 14 is a view taken substantially on the line 14—14 of Figure 13 and showing, in end elevation, the driven gear and the movement limiting disk of the differential gearing C;

Figure 17 is a diagrammatic layout of the apparatus with the various shafts shown in one plane;

Figure 18 is a horizontal section taken along the line 18—18 of Figure 9;

Figure 19 is a back view in elevation, of one of the piece-counter units;

Figure 20 is a sectional view of a detail showing the hundred bill stop switch mechanism;

Figure 22 is a front perspective view of a modified form of machine providing fit and unfit compartments for the more plentiful and most used denominations of currency;

Figure 23 is a diagram of the electrical system of the machine shown in Figure 22.

Figure 1:
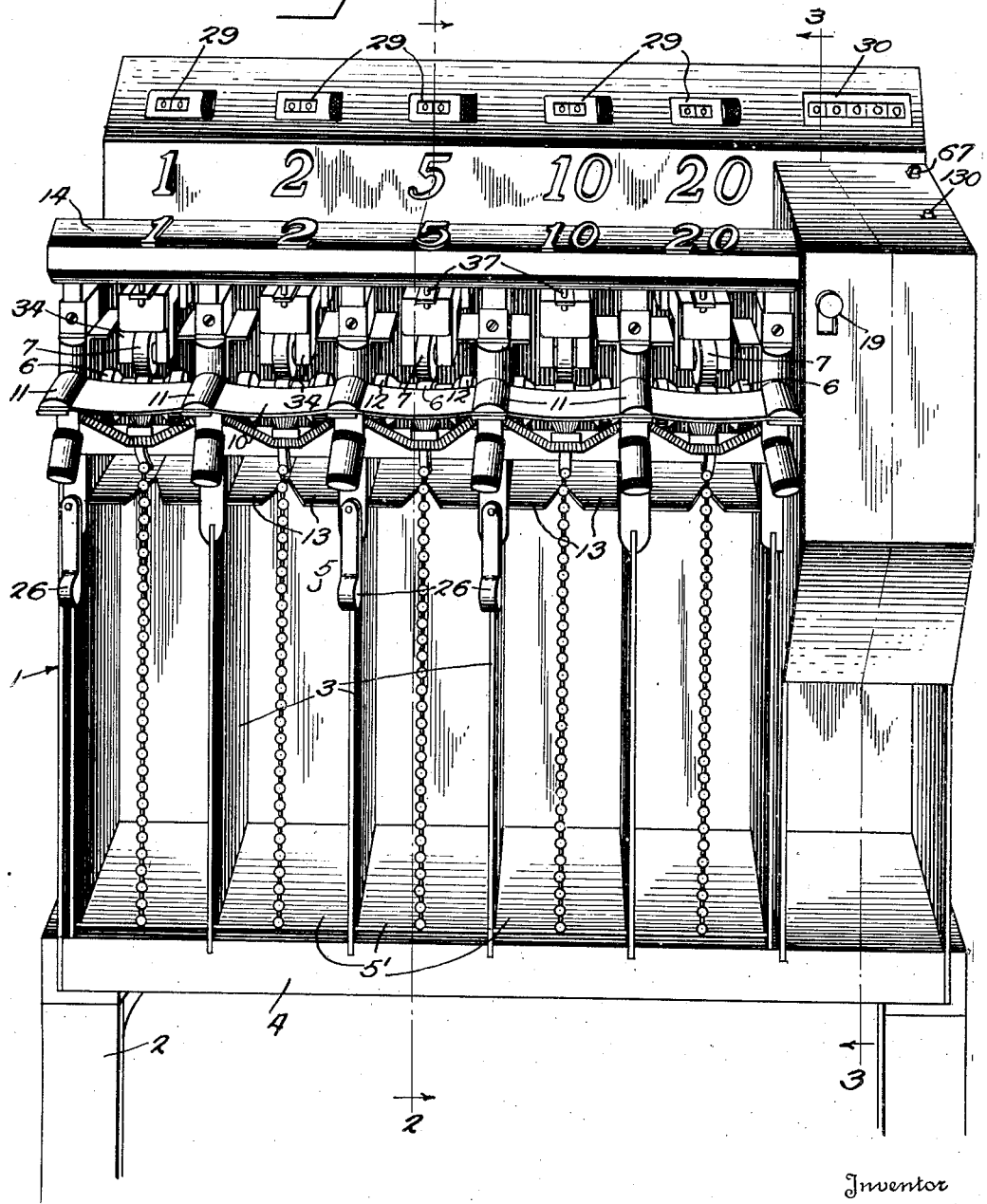
Figure 1 is a front perspective view of a machine embodying the principles of the invention.

The present application is a continuation-in-part of my pending application Ser. No. 408,261, filed August 25, 1941.

Referring now in detail to the several figures, and first adverting to the group of Figures 1, 2, 3, 4 and 5, the reference character 1 designates in general a cabinet which is mounted upon a suitable stand 2.

A plurality of vertical partitions 3 are arranged in parallel relation upon the base 4 and against the back wall 5, forming a series of compartments 5′, the horizontal cross-section of each of said compartments being of approximately the same size and shape as a bill, and adapted for the accumulation of stacks of bills, one denomination for each compartment.

A plurality of pairs of bill feeding rolls 6 and 7 are arranged, one pair at the upper forward end of each compartment. The lower rolls 6 of each pair are mounted upon and driven by a common shaft 8 (see Figure 2), from a belt and pulley connection to the electric motor 9. A shelf 10 extends horizontally in front of said series of compartments, and has its upper surface at about the level of the line of contact between the rolls 6 and 7, said shelf being suitably supported between said compartments by the angle brackets 11, and being slightly concave in a transverse direction. The concave shape of the shelf 10 causes a bill when laid thereupon to assume a trough-like shape, stiffening the bill so that it will shoot between the rollers into a compartment in a shape-retaining condition, instead of limply folding upon itself as it enters the compartment, thus assuring that the bills will stack themselves in the compartment the full length. The outer flanges 12 of the rolls 6 are of somewhat larger diameter than the middle of said rolls, for the same purpose.

The compartments 5′ are each divided horizontally near the top by a pair of shelves 13 which are hinged from the partitions 3 with their free longitudinal edges meeting in the middle. When bills are fed into the compartments they accumulate upon the shelves 13 until such time as it may be desired to dump them into the lower part of the compartment or compartments.

The compartments are preferably identified with the denomination of bills which they are designed to receive by a number corresponding to the denomination of the bills and arranged on a scale 14 at the upper front of the machine. Thus, beginning at the left in Figure 1, the compartments are designed respectively for the receiving of one dollar bills, two dollar bills, five dollar bills, tens and twenties.

The bills are sorted from a bundle of mixed money, in which according to the law of averages the two dollar bills may be least in number, the twenties next in number, more tens, a still greater number of fives, while one dollar bills are ordinarily the most numerous.

In sorting the bills, the operator standing before the machine with a bundle of mixed money, presents the bills one at a time to the feed rolls of the proper compartment, the bills being drawn in by the rolls and deposited upon the hinged shelves 13. Straps of bills of one denomination will accumulate much faster in the one, five and ten dollar compartments, than in the two dollar and twenty dollar compartments, so that provision is made for the individual dumping of the bills in each of these compartments.

Figure 5:
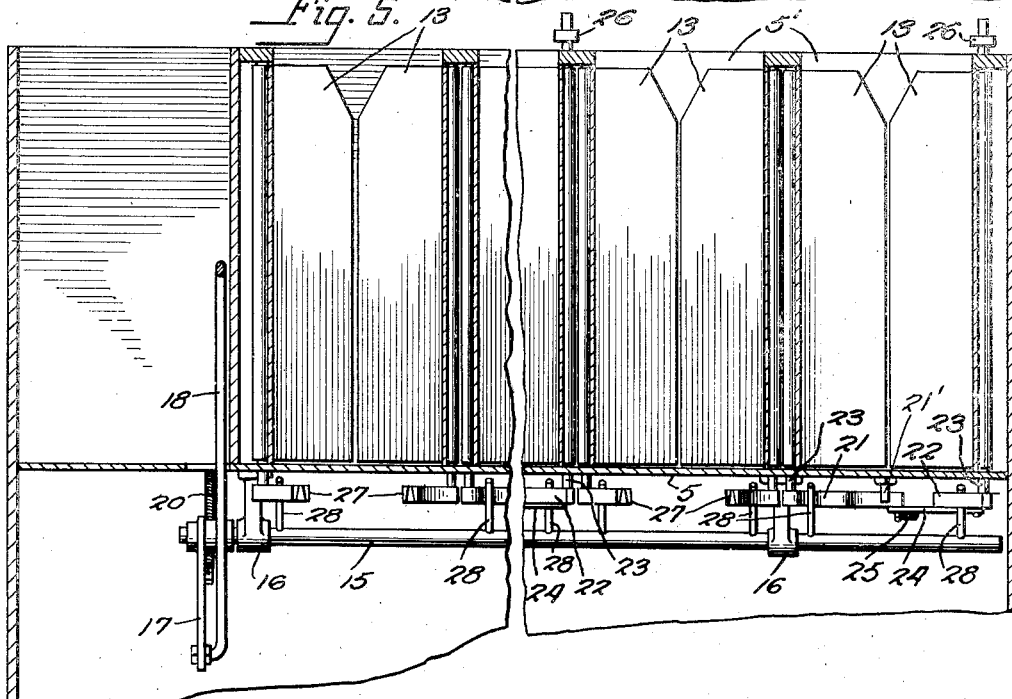
Figure 5 is a horizontal section taken on the line 5—5 of Figure 2.
Figure 8:
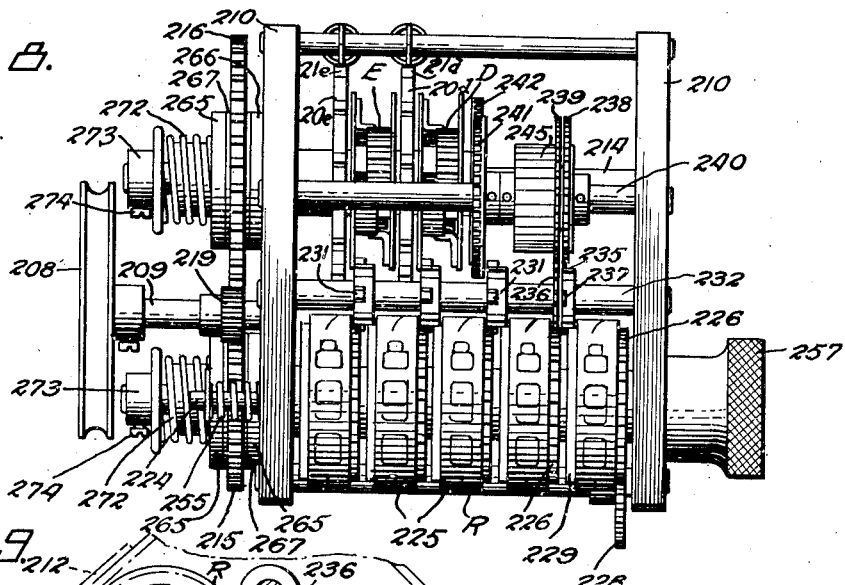
Figure 8 is a top plan view thereof, the casing being omitted.

After the sorting of the bills belonging to the account of one customer has been completed, it is usually desired to dump the shelves of all of the compartments, consequently, in addition to the means for dumping the shelves of certain compartments individually there are means provided for dumping all of the compartments simultaneously. Such means are shown in Figure 5, comprising a horizontal rock shaft 15 carried in suitable bearings 16 having fixed at one end a rocking lever 17 connected to an operating rod 18, the knob end 19 of which projects conveniently at the front of the machine. A spring 20 normally holds the rock shaft in inactive position with the hinged shelves 13 all closed, and said spring also holds the operating rod 18 in its inward position. The pairs of shelves 13 which are to be individually dumped, namely, the pairs associated with the one dollar, five dollar and ten dollar compartments are provided with a lever mechanism shown at the right of Figure 4, in which the respective levers 21 and 22 are fixed to the hinge shafts 23 which carry the shelves 13 and are connected to each other by a link 24. The lever 21 is held against a stop 21′ with the shelves closed, by a spring 25. One of the shafts 23 has a handle 26, Figure 3, which when depressed rocks the lever 22 in a counterclockwise direction as viewed in Figure 4, breaks the toggle, opens the hinged shelves and dumps the bills which have accumulated above them.

The hinge shafts of the shelves 13 of the two dollar and twenty dollar compartments are provided with the slotted levers 27 fixed thereto.

For the hinged shelves of all of the compartments the shaft 15 is provided with a series of pins 28, one for each shelf. Said pins engage in the slots of the levers 27 of the two dollar and twenty dollar compartments, and engage above the levers 21 and 22 of the one, five and ten dollar compartments, so that when the shaft 15 is rocked by an outward pull upon the knob 19, all of the slotted levers 27 and all of the levers 21 and 22 are simultaneously depressed, dumping the contents of the upper parts of all of the compartments into the lower parts of said compartments.

A piece-counter 29 of conventional type such as is disclosed in the patent to Veeder No. 1,480,738, granted January 15, 1924, is associated with each compartment and a value totalizer 30 operates in common for all the compartments responsive to the operation of any piece-counter.

The specific type of totalizer employed is one having a register provided with a plurality of counter wheel units including a units wheel, a tens wheel, and wheels of higher orders, in which the units wheel acts through the tens wheel upon the wheels of higher orders, and in which the tens wheel may be initially actuated and will act upon the wheels of higher orders independently of the units wheel. This enables the piece-counters which serve the 1 and 5 denominations to directly actuate the units wheel, and enables the piece-counters which serve the ten and twenty denominations to directly actuate the tens wheel. This results in material speed-up in the operation of the machine, for, by way of example, to register the denomination of a $20.00 bill on the totalizer requires only two steps of movement of the tens wheel, while to register it through the units wheel would require twenty steps of movement, or two complete revolutions of the units wheel.

The totalizer per se, which will now be described, is disclosed in the application for patent of Edward A. Slye, Serial No. 399,936, filed June 27, 1941.

Figure 9:
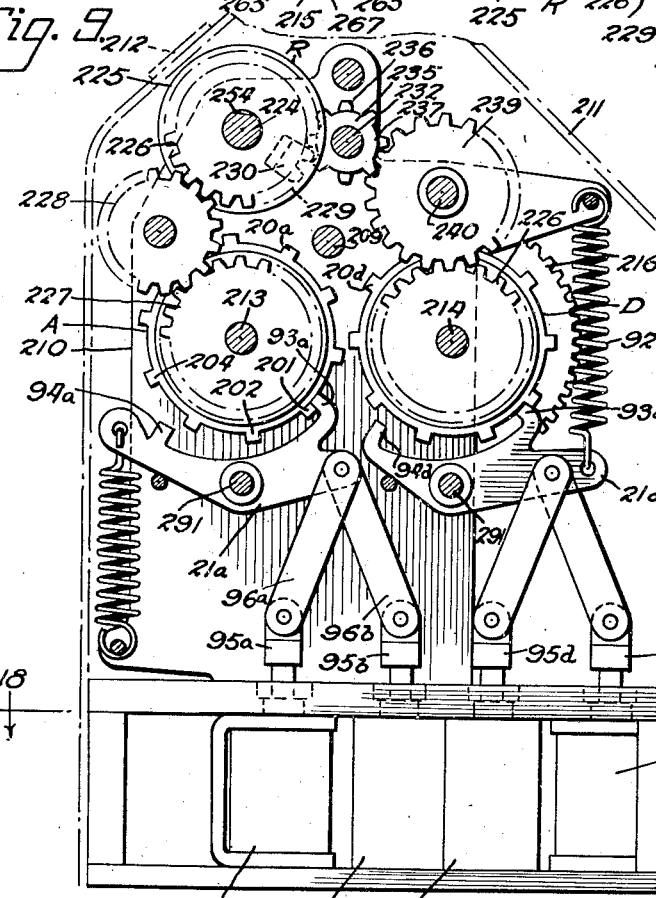
Figure 9 is a side view taken on the line 9—9 of Figure 7, the right hand frame member being omitted and the casing being shown in dotted line.

In order that the following detailed description of this totalizer may be more readily followed, brief reference is first had to the general organization and relation of the various instrumentalities. The general layout is diagrammatically shown in Figure 17. The totalizer has a frame comprising two spaced apart side plates 210, which support the register R and the shafts through which it is driven. The mechanism is housed within a casing 211, which has a window 212 (see Figure 9), through which the register R may be read. The register R, in which the various denominations are added, is shown as being in the form of a counter having a plurality of counter wheel units of successive orders, and transfer means between adjacent units through which each successive numeral wheel is advanced one step when the preceding numeral wheel makes a complete revolution. The wheel of lowest order is driven through a shaft 213, the extent of rotation of which is controlled by three differential gearings A, B and C, respectively, representing the three lower denominations. The wheel of second or tens order of the counter, in addition to receiving a carry-over from the units wheel, is driven through a shaft 214 acting through the transfer means between the first and second wheels, and on this shaft 214 are two differential gearings D and E, which represent denominations of two digits. These two differential gearings control the extent of rotation of the shaft 214. Means are provided for normally tending to drive the shafts 213 and 214, and to this end the respective shafts are provided with continuously driven gears 215 and 216 which are connected to the shafts by slip clutches which in the present instance are of the frictional type. The gears 215 and 216 are chain connected and are continuously driven by means of an electric motor 217 through a belt 218, a pulley 208 fixed to a stub shaft 209, and a pinion 219 fixed to the shaft 209 and meshing with the gear 216. Associated with each differential gearing is means for releasing the same and limiting the extent of rotation thereof, these means including in the present illustrative disclosure, toothed disks 20a, 20b, 20c, 20d, and 20e, each rotatable with one of the components of the differential gearing, escapement levers 21a, 21b, 21c, 21d, and 21e for releasing the disk and limiting the extent of rotation thereof on release, and solenoids 22a, 22b, 22c, 22d, and 22e for operating the levers. Solenoids 22a, 22b and 22c are associated with escapement levers which act upon the units wheel and respectively give it one, two and five steps of movement, and solenoids 22d and 22e are associated with escapement levers which directly actuate the tens wheel, giving it respectively one and two steps of movement, the operation of which escapement levers will be presently explained. When all of the escapement levers are in the holding positions shown in Figure 9, the friction clutches permit rotation of the gears 215 and 216 while the shafts 213 and 214 are held stationary by the then locked differential gearings. When any one of the differential gearings A, B or C is tripped by releasing an escapement lever from its associated toothed disk, it will permit the shaft 213 to be rotated through the friction clutch associated therewith to an extent corresponding to the denomination of the tripped differential gearing whereby the unit wheel of the counter will be driven to add the proper value in the counter. If two or more of the differential gearings A, B and C are tripped simultaneously or in such quick sequence that they may operate at the same time, the shaft 213 is rotated to an extent corresponding to the combined values of the denominations represented by the tripped differential gearings. The differential gearings D and E operate in the same manner as the differential gearings A and C, but in this case rotary movements of the shaft 214 permitted by the differential gearings D and E are communicated to the counter wheel of second order through the transfer means between the wheel of first order and the wheel of second order.

Referring now more specifically to the counter R, the same is here shown as being of an old and well-known type comprising a plurality of counter wheel units rotatably mounted on a reset shaft 224 journaled in the side plates 210. Each unit has a counter wheel 225 on the periphery of which are consecutively arranged numerals running from zero to nine. Each unit has a driven or so-called twenty-toothed gear 226 which may be operatively connected to its associated counter wheel 225 by mean of a one-way drive or ratchet in order to permit of the counter wheels being reset to zero without rotating the driven gears 226. This ratchet mechanism is not shown in the drawings, it being sufficient to say it may take the form of that shown in the United States patent to Bliss et al., No. 2,133,777, granted October 16, 1938. The driven gear 226 of the counter wheel unit of lowest order is driven from the shaft 213 through a gear 227 fixed thereon and an idler gear 228. A locking disk 229 is fixed to each numeral wheel 225 and carries a mutilated driving gear 230 comprising two teeth with a notch therebetween. Between adjacent counter wheel units is suitable carrying or transfer means through which each successive wheel is advanced one step when the preceding wheel has made a complete revolution. The carrying means between the wheels, except that one between the first and second wheels, may take the conventional form of a pinion 231 freely journaled on a rod 232 and having, as illustrated, alternately disposed wide and narrow teeth meshing with the driven gear 226 of a unit of higher order. When a wheel of lower order is turning from nine to zero, the mutilated gear 230 associated therewith will engage one of the shorter teeth of the transfer pinion so as to effect a transfer movement to the unit of next higher order. The locking disk 229 cooperates with the longer teeth of the transfer pinion so as to prevent rotation of the pinion except when the latter is rotated by the mutilated gear.

In order that transfer movements may be communicated from the unit wheel to the wheel of second order and rotary movements of the shaft 214 may be communicated to the wheel of second order, the transfer means between the unit wheel and the wheel of second order is of special construction. Obviously, this special construction may be used between any two wheels of the counter.

Figure 15:
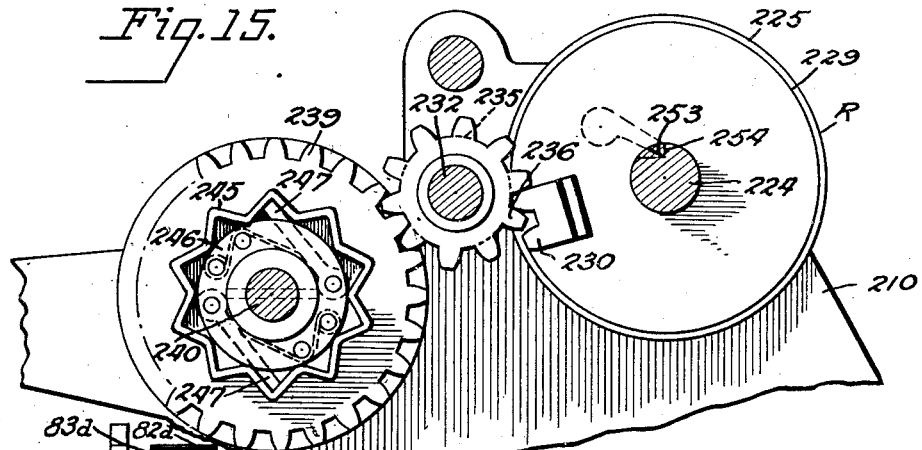
Figure 15 is a detail view taken substantially on the line 15—15 of Figure 16 and shows, in end elevation, the transfer means between the first and second counter wheel units of the register R and the ratchet mechanism associated therewith.
Figure 16:
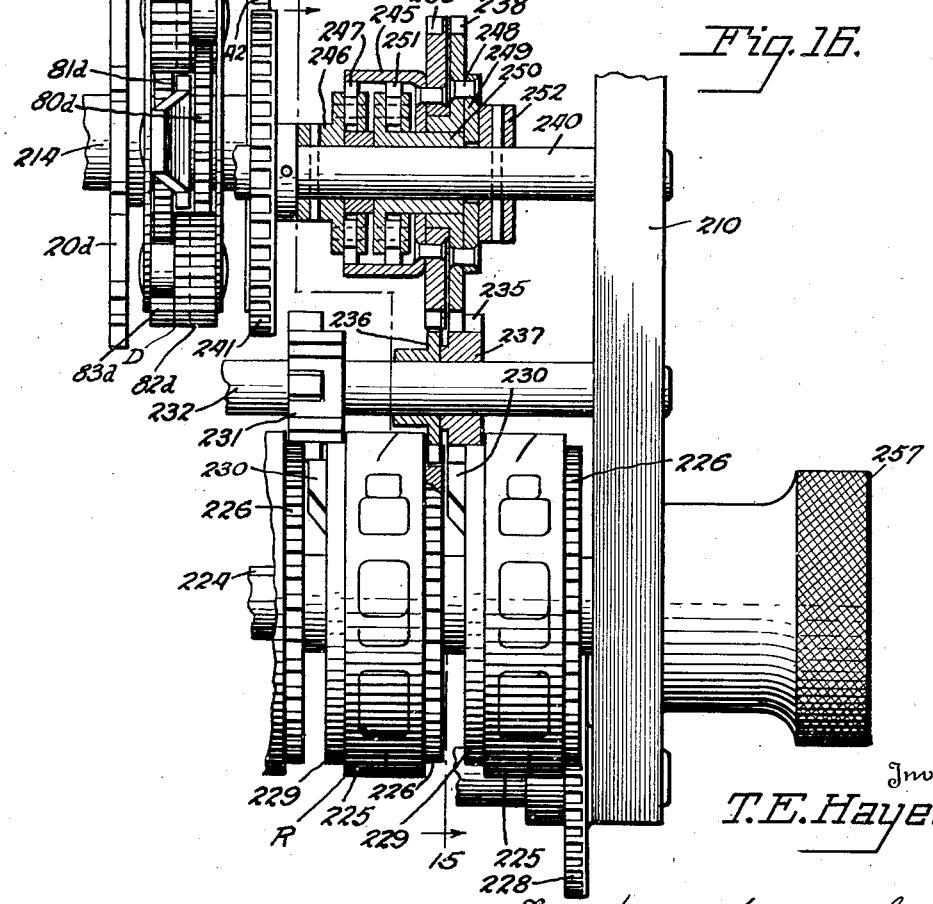
Figure 16 is a detail view, partly in top elevation and partly in section, of the structure shown in Figure 15.

Referring to Figure 16, it will be seen that the transfer pinion therebetween is split into two parts 235 and 236. The part 236 comprises a gear meshing with the driven gear 226 of the second counter unit. The other part 235, which cooperates with the locking disk and mutilated gear of the first unit, comprises a pinion 237 having teeth corresponding in number to the teeth of the gear 236, the teeth on the pinion 237, however, being alternately long and short. Rotation of the pinion 237 by the first wheel is communicated to the gear 236 through two spur gears 238 and 239 and rotation of shaft 214 is communicated to the gear 236 through the gear 239 only. The gears 238 and 239, respectively, mesh with the pinion 237 and the gear 236 and they are mounted on a shaft 240 to which is fixed a gear 241 meshing with a gear 242 fixed to the shaft 214. Fixed to the gear 239 is a ratchet wheel 245 and carried by a bushing 246 fixed to the shaft 240 are spring pressed pawls 247 cooperating with the ratchet wheel (see Figures 15 and 16). The gear 238 is fixed, as by means of rivets 248 to a disk 249, the gear being journaled on a sleeve 250 the latter being freely rotatable on the shaft 240 and the disk 249 abutting the end of the sleeve and being free with respect to said shaft. One end of this sleeve extends into the ratchet wheel 245 and is provided with pawls 251 corresponding in construction and operation to the pawls 247. A collar 252 is pinned to the shaft 40 so as to prevent longitudinal movement of the gears 238 and 239 thereon. With this arrangement, it will be seen that when the carrying movement is being transferred from the first to the second counter unit, while the shaft 240 remains stationary, the gear 238 is turned by the pinion 237 in the direction of the arrow shown in Figure 15 so that the pawls 251 cause the ratchet wheel 245 and the gear 239 to rotate in unison with the gear 238 whereby the driven gear 226 of the second counter unit is rotated one step, i. e., one-tenth of a revolution. During this time, the pawls 247 ratchet with respect to the ratchet wheel. When the shaft 214 is rotated, while there is no transfer movement between the first and second counter units, the pawls 247 will cause the ratchet wheel and the gear 239 to rotate in the direction of the arrow of Figure 15 to advance the second wheel of the counter A through a distance corresponding to the denomination or denominations of the tripped differential gearing D and E. During this time, the pawls 251 will ratchet with respect to the ratchet wheel so that the gear 238 will remain stationary.

Conventional means are shown for resetting the numeral wheels to zero. As shown in the drawings, each wheel has pivoted thereto a reset pawl 253 which is adapted to be picked up by a longitudinal shoulder 254 on the reset shaft 224 when the latter is rotated counterclockwise (see Figure 15) one complete revolution. The reset shaft is mounted for endwise movement and is normally urged by a spring 255 to the locked position shown in Figure 7. In this position, a pin 256 carried by the knob or handle 257 of the reset shaft engages in a bore or hole 258 in the side plate 210. When it is desired to reset, the knob is pulled to the right so as to disengage the pin 256 from the bore 258, the knob 257 and the shaft 224 are rotated one complete revolution, and when the shaft has been so rotated the pin will again register with the bore 258 so that the spring 255 will move the reset shaft back to the position shown in Figure 7.

As previously stated, the shafts 213 and 214 which support the differential gearings are adapted to be driven by the electric motor 217 through the gears 215 and 216 and slip clutches associated with those gears. These slip clutches are of like construction and, therefore, a description of one will apply to both. Referring particularly to Figure 11, it will be noted that the gear 215 is located between two flanges 265 and 266 and between these flanges and the gear are friction disks 267. The flange 266 is carried by a sleeve 268 secured to the shaft 213 by a pin 269. The flange 265 is carried by a sleeve 270 mounted on the sleeve 268 and having splineways 271 receiving the ends of the pin 269 whereby the sleeve 270 may slide longitudinally but is caused to rotate with the shaft 213 and the sleeve 268. The parts of the clutch are resiliently urged against each other by a spring 272 surrounding the sleeve 270 and interposed between the flange 265 and a collar 273 secured to the shaft 213 as by means of a screw 274.

The differential gearings of two series respectively associated with the shafts 213 and 214 are generally similar in construction and operation and, therefore, like numerals will be employed to indicate corresponding parts, the numerals applied to the parts of the several differential gearings being followed by suffixes $a$, $b$, $c$, $d$ and $e$ according to the several denominations. Referring to Figure 11, wherein is shown the three differential gearings A, B and C, associated with the shaft 213, the differential gearing A has a drive sun gear 80$a$ pinned to the shaft 213, a driven sun gear 81$a$, and two pairs of planetary gears 82$a$ and 83$a$. The planetary gears 82$a$ mesh with the sun gear 80$a$, and the gears 83$a$ mesh with the sun gear 81$a$ while the gears 82$a$ mesh with the respective gears 83$a$. The planetary gears are rotatably mounted in a carrier which comprises a pair of spaced plates 85$a$ between which the planetary gears are carried on pins 86$a$, the pairs of gears 82$a$ being carried by one plate and the pairs of gears 83$a$ being carried by the other. These plates are respectively riveted to the opposite ends of a spider 84$a$ carried by one end of a sleeve journaled on the shaft 213. The driven sun gear 81$a$ is secured to a sleeve 88$a$ journaled on the sleeve 87$a$. Formed integrally with this sleeve 88$a$ is a toothed disk 20$a$ which determines the extent of rotation of the first differential gearing when the same is released.

The differential gearing B is identical to the differential gearing A except that its drive gear 80$b$, instead of being pinned to the shaft 213 as is the gear 80$a$, is fixed by a key 79$b$ to the left-hand end of the sleeve 87$a$ so that the drive gear 80$b$ and the carrier of the differential gearing A constitute a single rotary unit. The drive gear 80$c$ of the differential gearing C is secured to the sleeve 87$b$ so that that drive gear and the carrier of the second differential gearing B form a single rotary unit. In the case of the differential gearing C, the carrier thereof is fixed against rotation and to this end the sleeve 87$c$ is secured to the side frame 210 as by means of a screw 290. This sleeve 87$c$ acts as a bearing for the shaft 213. In the present illustrative disclosure, wherein it is assumed that the differential gearings A, B and C correspond to $1.00, $2.00 and $5.00 denominations, the disks 20$a$ and 20$b$ each has ten stop teeth projecting from its periphery, and the disk 20$c$ has eight such teeth, it being understood, however, that the number of teeth provided on the several disks will depend upon the relation of the denominations or values to be added.

Referring to the series of differential gearings associated with the shaft 214, the differential gearing D is identical to the differential gearing A, and the differential gearing E is identical to the differential gearing C. The drive gear 80e of the last differential gearing is fixed to the left-hand end of the sleeve 87e of the differential gearing D so that that gear and the carrier of the differential gearing D constitutes a single rotary unit. Since, in the present illustrative disclosure, the differential gearings D and E respectively represent $10.00 and $20.00 denominations, each of the disks 20d and 20e has ten stop teeth thereon.

As previously stated, the differentials are controlled by the escapement levers 21 which respectively cooperate with the stop disks 20. The levers are pivoted between their ends on rods 291 and are normally urged into their latching positions shown in Figure 9 by tension springs 92. Each lever has a holding lug 93 and a stop lug 94 so arranged that each time the lever is tripped, the associated disk will rotate through an angle, the size of which depends upon the number of teeth with which the disk is provided. In the case of the differential gearings A, B, D and E, the disks are limited to a rotary movement of one-tenth of a revolution. In the case of the differential C, the disk 20c is limited to a rotary movement of one-eighth of a revolution. More particularly, it will be seen that in Figure 9 the left-hand lever 21a has its lug 93a engaging the front edge of a tooth 201 of the disk 20a. When the lever is moved clockwise, the lug 93a is withdrawn out of the path of the tooth 201, and the lug 94a is moved into the path of the tooth 204 so that the disk will rotate until the tooth 204 engages the lug 94a. When the lever again swings up to its normal position shown in Figure 9, the lug 94a is withdrawn from the tooth 204 and the lug 93a is moved into the path of the tooth 202 so that the disk will again rotate until the tooth 202 engages the lug 93a. Thus, upon each complete cycle of movement of the lever, the disk will rotate with two movements through one-tenth of a revolution. The levers are connected to the corresponding armatures 95a, 95b, 95c, 95d, and 95e of their respective solenoids 22a, 22b, 22c, 22d, and 22e by links 96a, 96b, 96c, 96d, and 96e.

The specific manner in which the apparatus operates will be clear from the following brief explanation. When all of the escapement levers 21 associated with the differential gearings of the series associated with the shaft 213 are in holding position, the disks 20a, 20b, and 20c are held against rotation and the differential gearings, acting through one another, are effective to hold the shaft 213 against rotation, in which case the continuously rotating gear 215 will slip with respect to the clutch associated therewith. More particularly, it will be seen, when this condition exists, that since two components of the gearing C (namely, its carrier and the driven gear 81c) are held stationary, the unit which comprises the drive gear 80c and the carrier of the gearing B is held against rotation and, as the latter carrier and the driven gear 81b are held against rotation, the unit comprising the drive gear 80b and the carrier of the first gearing A is held against rotation and as this latter carrier and the driven gear 81a are held against rotation, the drive gear 80a and the shaft 213 are held against rotation. Assuming now that the lever associated with the toothed disk 20a of the first gearing A is momentarily tripped by a bill of $1.00 denomination, the disk 20a and the drive gear 81a are free to rotate one step, that is, one-tenth of a revolution, and they will be so rotated because the gear 215 can now, through its friction clutch, pick up the shaft 213 and rotate it one-tenth of a revolution with the result that one digit will be added to the unit counter wheel of the counter through the gears 227, 228 and 229. During such revolution of the shaft, the carrier of the first differential gearing A is held stationary by the second differential gearing so that the planetary gears 82a and 83a constitute a direct connection between the drive gear 80a and the driven gear 81a. Assuming now that a $2.00 bill trips the escapement lever associated with the second differential B, the shaft 213 will rotate two steps, that is, one-fifth of a revolution, to add two digits to the unit wheel of the counters. It is observed that during such rotation of the shaft the carrier of the second gearing B is held stationary by the differential gearing C, the driven gear 81a of the gearing A is held stationary by the escapement lever associated with disk 20a, and the unit, comprising the carrier of the gearing A and the drive gear 80b of the gearing B, is free to rotate. Therefore, the drive from the shaft 213 to the disk 20b is through the gear 80a, the planetary gears 82a and 83a (which both revolve and rotate), the unit comprising the carrier of the gearing A and the drive gear 80b, the now non-revolving planetary gears 82b and 83b, and the driven gear 81b. When the gearing C is tripped by a bill of $5.00 denomination, the shaft 213 is free to rotate under the influence of the friction clutch associated therewith through half a revolution, in this instance the toothed wheel 20c being rotated one step through the first two differential gearings A and B (the carriers of which are held stationary) the drive gear 80c and the planetary gears 82c and 83c.

If more than one of the differential gearings A, B and C are released simultaneously or in such quick succession that the driven gears thereof are free to rotate at the same time, the combined movements of the released gearings are added so that the shaft 213 will be rotated by its friction clutch through an angle representing the combined denominations of the released differential gearings.

In view of the description just given, the operation of the differential gearings D and E associated with the shaft 214 will be clearly understood. When the differential D is tripped by a bill of $10.00 denomination, the shaft 214 will rotate through one-tenth of a revolution so that the second or tens wheel of the register R will be advanced one step. When the differential E is tripped by a $20.00 bill, the second or tens wheel of the register A is advanced two steps. In the event that both of the differentials D and E are tripped at the same time, their actions are combined so that the second or tens numeral wheel is advanced three steps.

Figure 2:
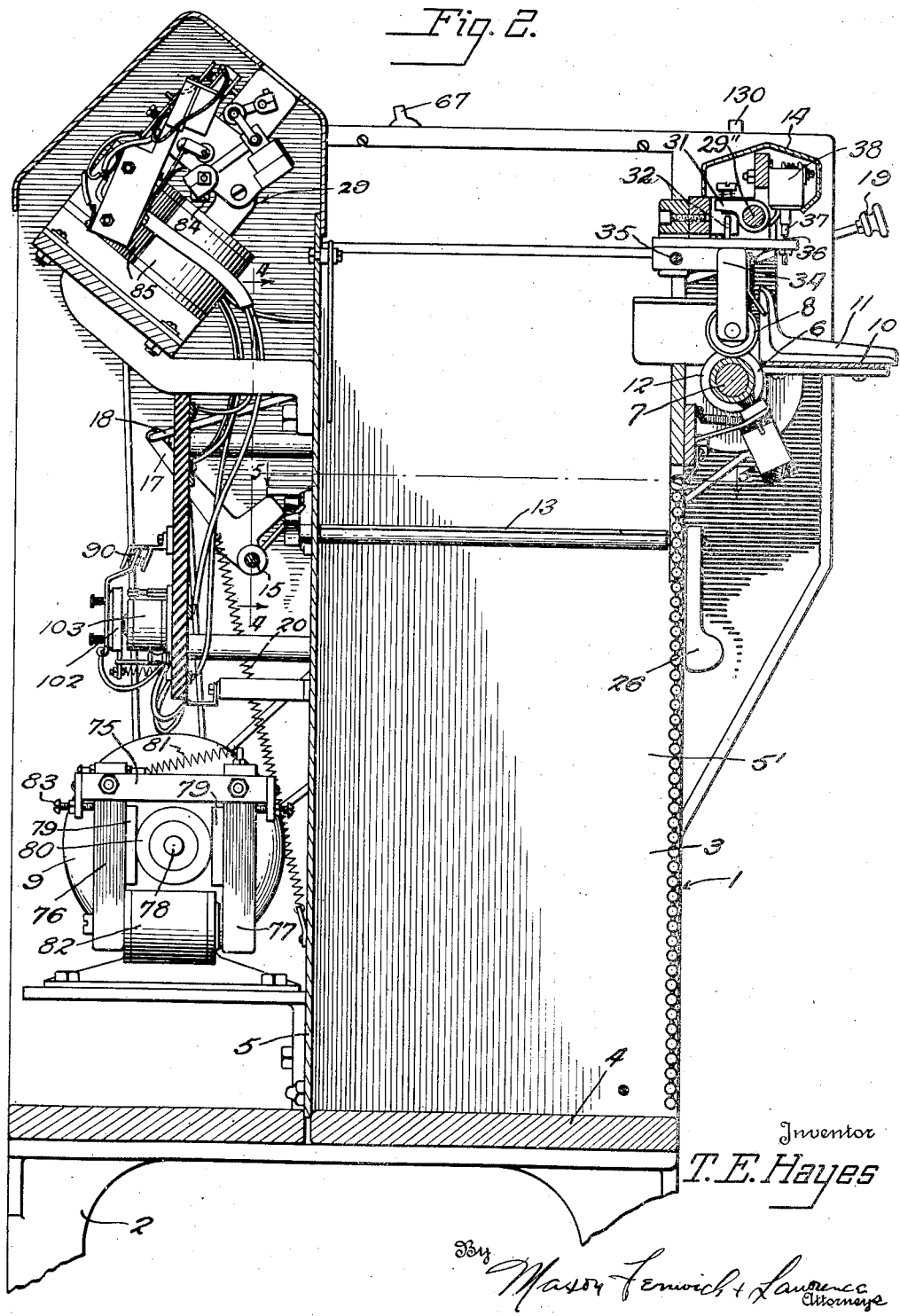
Figure 2 is a vertical section taken on the line 2—2 of Figure 1.
Figure 4:
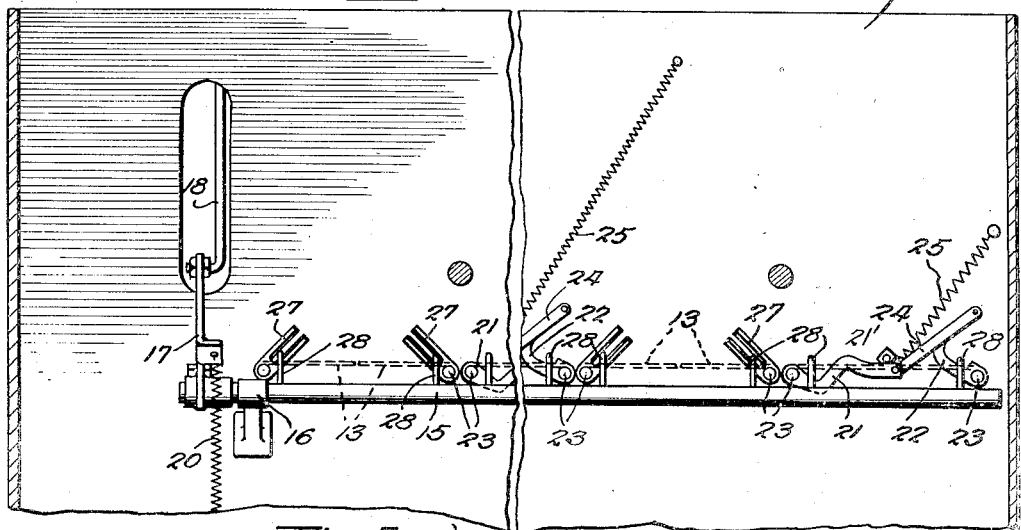
Figure 4 is a vertical section taken on the line 4—4 of Figure 2.

Referring now to Figures 1 and 2, the feed roll 7 is rotatably mounted in the downwardly extending bifurcated end of a tilting support 34 freely mounted on a shaft 35. Said support at its free end carries an adjusting screw 36 which operates the plunger 37 which actuates the hidden contacts of a micro-switch 38 to bring them together when the plunger is pressed upwardly. Said switch is closed through the slight upward movement of the tilting support, produced by the thickness of a single bill passing between the said rolls and lifting the roll 7. The micro-switch controls a number of circuits, one of which causes the actuation of the piece-counter associated with the compartment to which said switch belongs, and through the piece-counter, in quick sequence operates the totalizer to add a value corresponding to the identification number of the compartment with which the micro-switch is associated. It will be understood that there is a similar micro-switch for each compartment.

The piece-counter operated by the micro-switches of the group of compartments having the identification numbers 1, 2 and 5 are concerned with the actuation of the units wheel of the totalizer, while the micro-switches of the group of compartments whose identification numbers are 10 and 20, are concerned with the actuation of the tens wheel of the totalizer.

Figure 21:
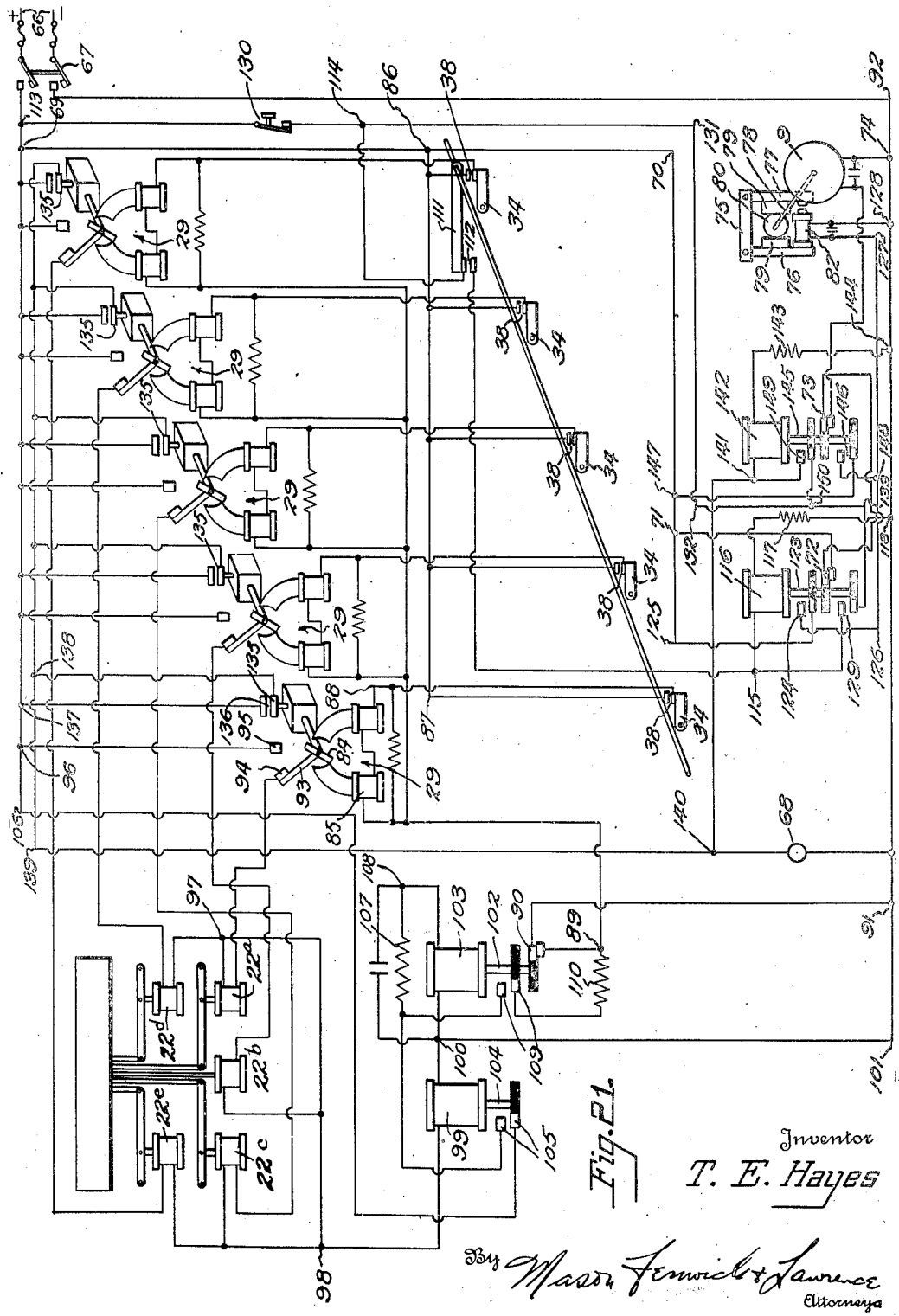
Figure 21 is a diagram of the electrical system of the machine shown in Figure 1.

The machine is electrically operated, being plugged into the house service lines at the point indicated at 66 in Figure 21. Upon closing the main switch 67, the motor 9 starts and continues running throughout the sorting operation, rotating the pairs of feed rolls 6 and 7 and the driven clutch element of the totalizer 30. There are two eventualities during the sorting and counting operation, in which the motor will be automatically stopped. One of these is when one hundred bills of a denomination, a "strap," has been counted. Upon the count of one hundred, the motor will stop, and a signal lamp 68 will light, indicating to the operator that a "strap" has accumulated, and giving him the opportunity to place a separator thereupon to segregate it from subsequently deposited "straps." The other circumstance is when anything having a thickness greater than a single bill, for example, two bills at once, or a folded bill, are presented between the feed rolls 6 and 7. In this case the motor stops to enable the operator to remove the obstruction. The motor circuit, therefore, has two normally closed gaps in series, one of which is opened responsive to the hundred count on any one of the piece-counters 29, and the other of which is opened responsive to the insertion between the feed rolls of anything having a greater thickness than that of a single bill.

The motor circuit may now be traced in Figure 21 beginning with the plus side of the line circuit at the upper right to the points 69, 70, 71, the closed gap 72 which opens upon the attempted inadvertent insertion of two or more bills at a time, through the normally closed gap 73, which opens at the hundred count on any of the piece-counters, to the motor 9 and from the motor through the point 74 back to the minus side of the line.

When the motor circuit is broken it is essential that the motor stop instantly without any trailing inertia movement. Consequently, an electric brake is provided, best shown in Figure 2, consisting of a fixed transverse bar 75 having pivotally depending pole pieces 76 and 77 on opposite sides of the armature shaft 78 with diametrically opposed brake shoes 79 adapted to bear frictionally upon a disk 80 on said armature shaft, normally biased away from said disk by a spring 81 and brought together by an electromagnet 82 fixed to one pole piece below said shaft and within attracting distance of the other pole piece. Adjusting screws 83 enable the pole pieces to be so set relative to the disk as to immediately equalize the pressure on both sides of the disk when the electromagnet is energized. Whenever the motor circuit is broken, the brake circuit is simultaneously energized to apply the brake to bring the motor to an immediate standstill.

Referring now to Figures 2 and 19, which show one of the piece-counter actuators in detail, and Figure 21 which shows it diagrammatically, the shaft of the piece-counter 29 is connected to an oscillating armature 84 arranged between the poles of a solenoid 85. When the solenoid is energized, the armature oscillates in a clockwise direction, as viewed in Figure 21, placing the mechanism of the piece-counter 29 in potential position to make the count, but not actually making the count until the armature has been released and returns to its normal position. This it does under the urge of a spring 96', Figure 19.

Referring now to Figure 21, when a bill is inserted between the feed rolls of any of the denomination compartments 5', for example, the one dollar compartment, it closes the micro-switch 38 and establishes a circuit through the corresponding piece-counter actuator, as follows: Through the points 69, 86, 87, the micro-switch 38, the point 88, solenoid 85, the point 89, the contacts 90 when closed, to the points 91 and 92 to the opposite side of the line. The closing of this circuit by the micro-switch 38 energizes the solenoid 85 and actuates the armature 84 in a clockwise direction to place the units wheel of the piece-counter 29 in potential position for a count. It is essential that a piece-counter shall assuredly operate for each operation of the totalizer. As the piece-counter solenoids do heavier mechanical work than the solenoids of the totalizer, it could be, under some abnormal working of the machine that if the piece-counter and totalizer were operated through independent circuits, the totalizer would register a count while the piece-counter would miss its count, causing a discrepancy between the piece counts and the totalizer sum which would be difficult to trace. Therefore, the subject machine provides that the piece-counter itself after it has moved to potential counting position shall close the circuit which operates the totalizer.

With this end in view, the armature 84 of the piece-counter solenoid is provided with a switch arm 93 having a contact 94 which engages a complementary fixed contact 95 when the armature has completed its potential piece counting movement. Said contacts of the respective piece-counters are in circuit with corresponding totalizer solenoids, the circuit of the one dollar piece-counter being traced from the plus side of the line through the point 96, contacts 95 and 94, totalizer solenoid 22a, points 97, 98, solenoid 99 (the function of which will presently be described), points 100, 101, and 92, to the minus side of the line.

Inasmuch as the micro-switch 38 is held closed during the entire passage of a bill, the piece count ordinarily would not be completed until after the micro-switch contacts had separated following the passage of a bill. As the piece-counter actuator is relatively slow in action, doing considerable mechanical work and being relatively heavily wound, there is considerable electrical as well as mechanical lag so that if a second bill is presented in very close sequence to the first bill, the micro-switch 38 might be again closed before the piece-counter armature has moved to actual counting position, so that a count would be missed. To prevent this, provision is made that the piece count shall be completed immediately after the armature 84 has been moved to its potential position, by breaking the actuator circuit while the micro-switch 38 is still closed, and for holding said actuator circuit broken during the passage of the bill to prevent repetitive recounts of a single bill, which would take place due to the closed condition of the micro-switch during the entire period of bill passage.

The actuator circuit is provided with a gap at the contacts 90, which gap as has been stated, is normally closed. It is opened by the movement of the armature 102 of a holding solenoid 103 which breaks the circuit through the piece-counter actuator solenoids 85 in which the micro-switch 38 is intercalated and which holds said circuit broken until it is normally broken by the opening of the micro-switch 38 upon the completion of the passage of a bill, permitting the return of the respective rotary armatures 84 to normal position and completion of the count.

The holding solenoid 103 is energized sequentially by primary and secondary holding circuits whose periods of energization are continuous so that the holding function of the solenoid 103 remains uninterrupted from the counting movement of the piece-counter up to the end of the passage of the bill.

The primary holding circuit is established through the intermediary of the solenoid 99 which with its armature 104 constitutes a "delaying" relay. When the solenoid 99 is energized through the closing of the piece-counter actuator contacts 94, 95 as hereinbefore described, the armature 104 is drawn up closing the contacts 105 of a circuit which passes through the point 106, contacts 105, resistance 107, point 108, holding solenoid 103, points 100, 101, 92 to the opposite side of the line.

Energization of holding solenoid 103 lifts the armature 102, opening the contacts 90 and closing the contacts 109. The opening of the contacts 90 breaks the circuit through the micro-switch 38 and piece-counter solenoid 85. This breaks the contacts 94, 95 of the totalizer solenoid 39, and the delaying relay solenoid 99, opening the contacts 105 and thereby breaking the primary energizing circuit of the holding solenoid 103.

Closing of the contacts 109 establishes a secondary holding circuit through the solenoid 103 which may be traced from the point 69 through the points 86, 87, micro-switch 38, point 88, solenoid 85, point 89, resistance 110, contacts 109, resistance 107, point 108, solenoid 103, points 100, 101, 92 to line.

The interposition of the series resistance 110 and 107 in this circuit reduces the current so that while it finds an avenue of passage through the solenoid 85, it is insufficient to energize this solenoid to operate the piece-counter armature 84, although quite sufficient to hold the armature 102 with the contacts 90 open.

The purpose of the delaying relay is explained as follows: When the holding solenoid 103 is initially energized, it takes a certain interval of time for the armature to move from the contact 90 to the contact 109, at which last named point of contact the secondary holding circuit is closed. But when the contacts 90 separate, the switch arm 93 drops back, breaking the contacts 94 and 95 and in the absence of the delaying relay, breaking the primary circuit through the solenoid 103. If this should happen before the armature 102 has closed the secondary holding circuit through contacts 109, the armature would fall, re-closing contacts 90 and remaking the piece-counter actuating circuit, repeating the count. By the interposition of the delaying relay 99, the primary holding circuit is not instantly broken by the opening of the contacts 94 and 95, but only after the further time interval required for the armature 104 to move, breaking the contacts 105. By this time the armature 102 of the holding circuit will assuredly have reached the contact 109.

It may be assumed, therefore, that there is a short time interval in which the holding solenoid is simultaneously energized both by the primary and secondary holding circuits, so that there is no idle interval of the holding solenoid throughout the movement of its armature, and no danger of the armature dropping back to the position in which it closes contacts 90.

It will be understood that the piece-counter and the actuator therefor is repeated for each of the denomination compartments, there being individual parallel circuits associated with each actuator for breaking the primary circuit of each actuator and a common holding circuit for all of the compartments operating through the solenoid 103.

We now come to a description of the circuits and circuit instrumentalities involved in the stopping of the motor and the application of the brake thereto when two bills or a folded bill are inadvertently presented to the feed rolls. Figure 21 shows that the tilting support 34 for each of the micro-switches 38 is freely mounted on a common shaft 35 about which it tilts upon the lifting of the roller 7. A shaft 29" common to all the roller stations parallels the shaft 35 and is provided at one end with a switch arm 111 for closing a gap 112 in a circuit which controls the stopping of the motor and the application of the brake. Referring to Figure 2, it will be noted that at each roller station the shaft 29" has a fixed arm 31, extending therefrom overlying an actuating pin 32 carried by the tilting support 34. The rise of the pin 32 responsive to the thickness of one bill inserted between the feed rolls is insufficient to bring it into operative engagement with the arm 31, but a rise responsive to a greater interposed thickness causes the pin to lift the arm 31, rocking the shaft 29" and closing the gap 112. The adjustment of the size of the gap 112 is such that when a single bill lifts the tilting support 34 the amount of rocking movement imparted to the shaft 35 is insufficient to cause the switch arm 111 to close the gap 112, but when two bills together or a folded bill press the feed rolls apart, the amount of tilt imparted to the shaft 35 closes the gap 112 and energizes a circuit which can be traced as follows: From the point 113 through the point 114, across the closed gap 112 through point 115 to a holding solenoid 116, through a resistance 117 to point 118 on the return bus. In the event that the thickness of the obstruction is more than enough to bring the switch arm 111 into closed relation to the gap 112, the switch arm 111 is made in sections 119 and 120 pivoted at the point 121 and held together as a unit by the spring 122, all as shown in Figure 3. After the switch arm has moved sufficiently to close the gap 112, the outer section 120 yields against the tension of the spring 122, preventing undue strain of the parts.

The circuit closed by the arm 111 energizes the solenoid 116, pulling up the armature 123, opening the gap 72 which breaks the motor circuit hereinbefore described, and closes the gap 124 which closes the brake circuit. This circuit is traced as follows: From point 71 in the motor circuit, through point 125, the closed gap 124, points 126, 127 to brake solenoid 82, then returning at point 128 to the return bus. The brake is thus simultaneously applied with the breaking of the motor circuit. At the same time, the armature 123 closes the gap 129, completing a holding circuit through the solenoid 116 which may be traced from the point 113 through a normally closed switch 130 through points 131, 132, 133, closed gap 129, thence through point 115 through the solenoid 116, resistance 117 to the point 118 on the return bus. The purpose of this holding circuit is to keep the motor circuit open and the brake applied after the gap 112 reopens through the removal of the obstructive thickness beneath the micro-switch 38. This holding circuit may be broken, the brake released and the motor automatically re-started at the will of the operator, by opening the switch 130.

The operator may remove the obstructing bills in two ways, either by drawing them out from between the feed rolls while the motor is stopped, or by placing her hand in the upper compartment beneath the feed rolls, so as to catch the obstructing bills and prevent them being deposited upon the bills already in the compartment, then starting the motor by opening the switch 130, thereby causing the bills to be fed into her hand. As a count is thus made, she must then deposit one of the bills of the proper denomination in the compartment, and run the other again through the feed rolls.

Reference is now made to the mechanism and circuits which stop the motor and apply the brake when a strap of a hundred bills has been counted for any one of the compartments. The tens wheel of each piece-counter, see Figure 20, is provided with a projection 134 in the same radius as the zero digit, which projection engages a movable switch contact 135, closing a gap 136 and completing a circuit which is traced as follows: From the point 137 in the plus bus, through closed gap 136 through points 138, 139, 140, 141 through relay solenoid 142, resistance 143 to point 144 on the minus bus. The projection 134 closes the gap 136 when the reading of the piece-counter is approaching 00, that is to say, when the count is 100. Energization of the relay 142 resulting from the closing of this gap pulls the armature 145, opening the gap 73 in the motor circuit, stopping the motor and at the same time closing a gap 146 in the brake circuit. The brake circuit is traced as follows: From the point 147 in the motor circuit through the closed gap 146 through point 148 to the brake solenoid 82 and returning by way of the point 128 to the return bus. The brake is thus applied simultaneously with the breaking of the motor circuit.

It is desired that the motor shall remain stopped until again started by the operator, to avoid any additional counts after a strap of one denomination has been accumulated, consequently, a holding circuit for the solenoid 142 is provided which is closed by closure of the gap 149 through the inward movement of the armature 145. This holding circuit may be traced as follows: From point 113 through the normally closed switch 130 through points 131, 132, 150 through the closed gap 149, through the solenoid 142, resistance 143, to the point 144 on the return bus. This holding circuit is broken, the motor re-started, and the brake released when the operator opens the switch 130.

The signal lamp 68 is in a parallel branch of the circuit closed by the projection 134 on the tens wheel of the piece-counter, and lights at the count of 100 on any piece-counter.

While the operation of the machine has been described piecemeal in connection with the several instrumentalities and circuits hereinbefore described, it may be here coherently related in the interest of clarity. The operator starts the machine by closing the main switch 67. The motor now operates continuously, revolving the several sets of feed rolls and also the driven clutch element of the totalizer. From a bundle of mixed paper currency the operator selectively feeds bills one at a time into the several appropriate compartments according to their denomination. Each time a bill passes through the feed rolls it is counted on the corresponding piece-counter and its value is registered on the totalizer. Presently, the one hundredth bill of a certain denomination is fed into one of the compartments. The motor immediately stops and the signal lamp 68 is illuminated. The operator notes which piece-counter registers 00 and places a separator on top of the strap of bills in that compartment. The operator then restarts the motor by pressing the switch 130, and resumes sorting the bills. Presently, one or more of the compartments becomes filled with straps of currency above the hinged shelves 13, presumably the one dollar, five dollar or ten dollar compartments, which can be individually dumped. She then dumps the filled compartment by manipulating the appropriate one of the handles 26.

Perhaps through inadvertence she presents two bills superposed to one of the pairs of feed rolls. The motor immediately stops, the brake being simultaneously applied, without feeding the two bills through the feed rolls. The operator then either draws the bills out or by placing her hand inside the compartment in the manner previously described, starts the motor and permits the bills to be fed into her hand. She then places the appropriate one of the bills in the compartment, for a count has been made and the value of the bill registered on the totalizer. She then proceeds, as before, to sort the bills. When the entire account has been sorted she pulls the knob 19, dumping all of the sorted bills above the hinged shelves 13, whether they be completed or incompleted straps, into the lower portions of the compartment. She then makes note of the totals of all of the piece-counters and of the totalizer. Discrepancy between the totalizer reading and the cashier's total which comes with the account may indicate an error in sorting, the compartment as to which the error is made being generally readily deducible through the nature of the discrepancy.

In the foregoing specifications I have described a five compartment sorting machine which takes no account of the desirability of sorting the bills according to their fitness or unfitness for further circulation.

The Federal Reserve Banks, however, require most of the commercial banks to sort their bills "fit and unfit." I, therefore, build machines with eight compartments to enable the sorting of currency as to "fit and unfit" as well as according to denominations. Such a machine is illustrated in Figure 22, which differs from the five compartment machine, in that two compartments are provided for the sorting of "fit and unfit" one dollar bills, two, for "fit and unfit" five dollar bills, and two, for "fit and unfit" ten dollar bills, since two dollar bills and twenty dollar bills do not circulate so freely as bills of the other denominations, and therefore, remain fit for a long time, this particular machine does not provide for the sorting of the twos and twenties in the "fit and unfit" and has a single compartment each for bills of these denominations.

Each of the compartments, both those for "fit and unfit" currency, as well as the two dollar and twenty dollar compartments, has an individual piece-counter associated therewith, said piece-counters being designated as 29 for the "fit" compartments and 29' for the "unfit" compartments. The instrumentalities, circuits and operative sequence for each compartment are the same as in the five compartment machine previously described, with the exception that both compartments of a pair devoted respectively to "fit and unfit" bills of the same denomination are connected to the totalizer solenoid, to register the value of bills both "fit and unfit," on the totalizer.

This is simply accomplished by connecting in parallel the movable contacts 94 of the piece-counters 29 and 29' associated with the "fit and unfit" compartments of a pair identified with the same denomination. This connection is represented in the diagram, Figure 23, by the respective wires 151, 152 and 153.

It is obvious that this machine can readily be adjusted to sort "fit and unfit" currency of any denominations, including twenty dollar bills, if desired, simply by changing the designation numbers of one or more of the compartments, connecting the desired movable contacts 94 in parallel and to the proper solenoid of the totalizer. For example, if it were desired to eliminate the sorting of two dollar bills altogether and to sort twenties as "fit and unfit," it would be necessary merely to remove the designating number 2 from the third compartment, to shift the numbers 5, 5 and 10, 10 leftward a distance of one compartment to fill the space vacated by the number 2, to insert a number 20 to designate the next to last compartment, and to connect the movable contacts 94 of the piece-counters associated with the compartments having the same designation number, in parallel and to the proper totalizer solenoids.

While I have in the above description disclosed what I believe to be a preferred and practical embodiment of my invention, it will be understood to those skilled in the art that the specific details of construction and arrangement of parts as herein described and illustrated are by way of example and not to be construed as limiting the scope of the invention.

What I claim as my invention is:

1. A machine for piece counting and value totalizing paper money manually sorted in said machine, comprising in combination a totalizer of that type having a units wheel and a tens wheel in which the tens wheel is operated by the units wheel and alternatively independently thereof, a series of compartments, each one designated for receiving only like bills of one digit denominations, a series of compartments, each one designated for receiving only like bills of two digit denominations, bill feeding means for each compartment comprising a pair of rolls between which bills are fed to said compartment, a piece-counter for each compartment including an armature connected to the piece-counter and an actuating solenoid therefor, a switch for each feeding means actuated by the passage of a bill between said rolls, circuits, one for each switch through the respective piece-counter solenoids for energizing said solenoids for moving the corresponding piece-counters to potential counting position, a switch for each piece-counter having an element movable with the armature of said piece-counter, positioned to close said switch after a count-assuring movement of said piece-counter, toltalizer actuating solenoids, one for each piece-counter, in circuit with the respective piece-counter switches, means for independently turning the units and tens wheels of said totalizer, and individual releasable means corresponding to the respective piece-counters of units denomination and independently locking said units wheels against movement, individual releasable means corresponding to the respective piece-counters of tens denominations, for independently locking said tens wheel against movement, said locking means being constructed to limit the respective amplitudes of movement of said wheels when released, proportionate to the denomination values with which the corresponding units piece-counters are associated, and to limit the respective amplitudes of movement of said tens wheel when released, proportionate to the denomination values with which the corresponding tens piece-counters are associated.

2. Machine for piece counting and value totalizing paper money manually sorted in said machine, comprising in combination a totalizer of that type having a units wheel and a tens wheel, in which the tens wheel is operated by the units wheel and alternatively independently thereof, means forming stations, each one designated for only like bills of one and two digit denominations, each for the successive deposit of bills of the same denomination, a piece-counter individual to each station for registering the successive count of bills deposited at said station, having an element movable incident to the registering of a count, means at each station operatively connected to the corresponding piece-counter for causing the latter to register a count when said means is actuated, said means being actuated by a bill presented at said station, means for independently turning the units and tens wheel of said totalizer, individual releasable means corresponding to the respective piece-counters of units denominations for independently normally locking said units wheel against movement, and individual releasable means corresponding to the respective piece-counters of tens denominations for independently locking said tens wheel against movement, respective locking means being released responsive to counting movement of the corresponding piece-counter, said locking means being constructed to limit the respective amplitudes of movement of said units wheel when released, proportionate to the denomination values with which the corresponding units piece-counters are associated, and to limit the respective amplitudes of movement of said tens wheel when released, proportionate to the denomination values with which the corresponding tens piece-counters are associated.

3. Machine for piece counting and value totalizing paper money of units and tens denominations manually sorted in said machine, comprising means forming stations each one designated for only like bills, each for the deposit of bills of the same denomination, a piece-counter individual to each station for registering the successive count of bills deposited at that station, means at each station responsive to engagement by a bill at said station for operating the corresponding piece-counter, a motor driven totalizer having a units wheel and a tens wheel in which the tens wheel is alternatively operated by the units wheel or independently thereof, means for controlling the motor imparted movement of said units wheel normally inhibiting movement of said units wheel, controlling by the respective units piece-counters after a counting movement of said piece-counters, but to permit and determine amplitudes of movement of said units wheel proportionate to the denomination values with which said respective units piece-counters are associated, and means for controlling the motor-imparted movement of said tens wheel, normally inhibiting movement of said wheel, controlled by the respective tens piece-counters after a counting movement of said piece-counters but to permit and determine amplitudes of movement of said tens wheel proportionate to the denomination values with which said respective tens piece-counters are associated.

THOMAS E. HAYES.